(12) United States Patent
Wilson

(10) Patent No.: US 6,518,209 B2
(45) Date of Patent: Feb. 11, 2003

(54) CHEMICAL RESISTANT GLASS FUSING COMPOSITION AND PROCESS FOR METAL MOTOR VEHICLE AND BUILDING INDUSTRY ARTICLES

(76) Inventor: Gary D. Wilson, 12611 NE. 99th St., Suite 126, Vancouver, WA (US) 98682

( * ) Notice: Subject to any disclaimer, the term of this patent is extended or adjusted under 35 U.S.C. 154(b) by 0 days.

(21) Appl. No.: 09/904,418

(22) Filed: Jul. 12, 2001

(65) Prior Publication Data

US 2002/0102421 A1 Aug. 1, 2002

Related U.S. Application Data

(60) Provisional application No. 60/218,225, filed on Jul. 14, 2000.

(51) Int. Cl.⁷ .............................. C03C 8/14; B05D 3/02
(52) U.S. Cl. ............................ 501/17; 501/20; 501/21; 427/376.2
(58) Field of Search ............................ 106/14.05, 600, 106/628, 48; 501/78, 17, 15

(56) References Cited

U.S. PATENT DOCUMENTS 4,260,662 A * 4/1981 Wratil .......................... 428/433
4,312,951 A * 1/1982 Eppler ......................... 428/428

* cited by examiner

Primary Examiner—Deborah Jones
Assistant Examiner—G. A. Blackwell-Rudasill
(74) Attorney, Agent, or Firm—Kurt M. Rylander

(57) ABSTRACT

A chemical, thermal, and electrical corrosion resistant dry mix for use in fusing glass to metal motor vehicle and building industry articles. A chemical, thermal, and electrical corrosion resistant composition for fusing glass to metal motor vehicle and building industry articles. A method of glass fusing metal motor vehicle and building industry articles using a chemical, thermal, and electrical corrosion resistant dry mix. A method of glass fusing metal motor vehicle and building industry articles with a chemical, thermal, and electrical corrosion resistant composition. A method of fusing single or multiple layers of glass to metal motor vehicle and building industry articles.

17 Claims, No Drawings

CHEMICAL RESISTANT GLASS FUSING COMPOSITION AND PROCESS FOR METAL MOTOR VEHICLE AND BUILDING INDUSTRY ARTICLES

CLAIM OF BENEFIT

The present application claims the benefit of prior U.S. Provisional Patent Application Serial No. 60/218,225 filed on Jul. 14, 2000.

FIELD OF THE INVENTION

The instant invention relates to methods and articles for fusing electrical, heat, chemical, corrosive, scratch resistant, non-VOC deterioration of pigmented, permanent coloration glass to motor vehicle parts and to construction parts, and particularly to articles and methods using glass porcelain enamel.

BACKGROUND

Because of its highly competitive nature, the motor vehicle industry as well as the marine industry has long endeavored to provide longer and more comprehensive manufacturers' warranties for their finished products. Their goal has been to increase the useful life of critical operational parts in their vehicles to exceed anticipated warranty periods of 100,000 miles and 10 years.

Various grades of stainless steel, aluminized steel, carbon steel, and titanium-steel alloys have been tested in an effort to accomplish their goals. Success from these efforts has, at best, been limited. Therefore, the primary challenge facing these manufacturers is the ongoing search for a protective coating for these critical metal parts in order to ensure that the useful life of these parts does not end prematurely through corrosion, metal fatigue or both.

Engineers for motor vehicle manufacturers are also faced with increasing environmental demands from state and Federal agencies concerned with the use of hazardous and toxic materials that exist in the solvents used in these coatings. It is anticipated that chrome plating and other plating processes will be banned in the near future because of the toxic by-products produced and the dangerous environment in which plating workers have to labor.

The predominant metals used in vehicles are stainless steel, carbonized stainless steel, carbon steel, aluminum, cast aluminum, gray iron and cast iron. Motor vehicle and marine manufacturers acknowledge that these metals must be protected from such harsh external elements as salt, rain, snow hail and heat, as well as the chemicals used internally to make their vehicles operational, including, but not limited to, battery acid, oil, gasoline, diesel fuel, brake fluid, hydraulic and transmission fluids.

The manufacturers seek a coating which can be produced and applied in an environmentally friendly manner and can protect these metals from such destructive forces (both internally and externally) as corrosion, chemical attacks, high heat and sub-zero cold. The coating must be able to expand and contract as the metals expand and contract and must be impervious to penetration from salt, gravel, water and chemicals. Thermal shock caused by extreme heat and cold can cause most coatings to crack, peel or check causing the metal to be exposed to the elements.

Presently the manufacturers use the following protective coatings on their vehicles:

1. Solvent based coatings. These coatings have a high level of Volatile Organic Compounds (VOCs) and thus the applicators are required to file an environmental impact statement and pay a tax or license fee in order to use these products. The application must take place in a highly controlled and enclosed environment that is properly ventilated. The fumes must be filtered or destroyed before being emitted into the atmosphere. Employees must wear protective clothing and an approved breathing apparatus while applying the coating. These membrane coatings historically have not had the durability to pass a scratch test or a heat test. Some coatings even fail to pass thermo-shock and gravel meter tests.

2. Water borne coatings. These membrane coatings have met the VOC guidelines of state and Federal environmental agencies, but, depending on the contents, Hazardous Air Pollutants (HAPs) can make even water-based coatings hazardous. When applied, these coatings can be either air-dried or heat-cured at low temperatures (250 degrees Fahrenheit to 650 degrees Fahrenheit). After application, operating temperatures of 1,000 degrees Fahrenheit to 1,100 degrees Fahrenheit will cause the coating to fail whereupon the metal will begin to corrode. This type of coating is not scratch resistant or chemical resistant. When exposed to high heat, the zinc undercoat is prone to failure and will peal off. If the coating is applied without a zinc primer, chemicals will be able to penetrate to the metal surface and will undercut the coating with rust.

3. Urethane coatings. This is a rubber-based synthetic resin containing either water or solvent. These types of coatings perform well to protect against weathering and salt penetration. These coatings, however, to not hold up when exposed to ethanol, glycols, brake fluids or battery acids. High heat will cause these coatings to break down.

4. Powder coatings. These coatings are applied to vehicle parts in dry form. Some powder coats are silicate based and must be monitored by state and Federal environmental agencies due to the HAPs contained in the silicate compounds that can escape into the air when applied. The rooms where the silicate-based powder are applied must be well ventilated and filtered. Protective clothing and an approved breathing apparatus must be work at all times for workers' protection. At application, these coatings are baked on at temperatures of 500 to 850 degrees Fahrenheit. These coatings have shown some durability to weather but tend to fail when attacked by chemicals and salt. These coatings are not scratch resistant.

5. Epoxy coatings. If oil-based, these coatings are high in VOCs. If water-based, they have HAP problems. In either case, they have the attendant environmental safety problems that must be satisfied as previously discussed. Both types of coatings perform well when attacked by chemicals, but fail when exposed to ultraviolet light or temperatures in excess of 500 degrees Fahrenheit.

Vehicle manufacturers have established exhaustive testing programs to ensure that critical parts are capable of lasting and performing for a minimum period of time. In some cases these tests simulate the wear and tear (without part failure) which can be expected to occur during a minimum of 100,000 miles of driving and in some cases as much as 1,000,000 miles. Modern day parts must be able to withstand cold temperatures as low as −30 degrees C. and hot temperatures as high as 450 degrees C.; they must be abrasion resistant, resistant to a wide variety of chemicals and salts.

The heat generated by the exhaust systems has troubled the automobiles as well as the trucking industries. The exhaust system of both gasoline and diesel engines are subject to very severe operating conditions, due to the high temperatures (1000 degrees Fahrenheit to 1450 Fahrenheit) of exhaust gases. The behavior of steel at high temperatures, i.e., expansion, creep, thermal shock, mechanical fatigue, oxidation and corrosion resistance are factors determining reliability.

Catalysts placed in a ceramic cone create a heat source for the exhaust gases to light off any carbon monoxide, nitrogen oxide, and unburned hydrocarbons. The temperature of these gases internally passing through the exhaust system of gasoline engines reaches 1400 degrees to 1800 degrees Fahrenheit at the catalytic converter. This temperature must be maintained (volume of area of heat) to destroy the three gasses mentioned above.

If a constant insulated heat source is maintained from the engines manifold to the catalytic converter a faster light-off is created thus reducing exhaust pollutants being emitted from the engine exhaust pipe into the atmosphere. Before light-off begins, a temperature of 400 to 600 degrees Fahrenheit must be achieved, or all of the pollutants are emitted into the atmosphere. To improve this light-off action created by a catalytic converter, automobile manufacturers moved the converter closer to the engine. This generated heat problems in the firewall area under the hood. Some manufacturers used two to three smaller converters to extend the heating area of the exhaust system thus improving the reduction of pollutants. This also generated additional heat problems in the firewall area. By increasing the heat under the hood of the automobile, more expensive insulation of wiring harness and fuel and oil lines was needed. A solution must be developed to resolve the problem of maintaining heat from the engine to the catalytic converter for faster light-off and to, maintain that temperature after it flows through the converter to destroy the pollutants emitted from the gasoline engine. The second problem that must be resolved is reducing the heat from the exhaust system to the fuel and electrical systems to prevent shut down or engine failure.

Similarly, known methods of heat insulation for engine parts of motor vehicles exist that do not satisfy the aspects of the provided invention. Heat has been the problem when generated from gasoline and diesel engines. Many manufactures have used the following for heat insulation: (1) silica glass fabric sacks and blankets, (2) ceramic woven glass fabric blankets, (3) double wall piping using air, (4) ceramic and silica based coatings, (5) glass blanket material inside a metal sleeve, and (6) heat shield devices to cool temperature.

The existing methods have disadvantages.

Silica glass fabric sacks have a thermal conductivity K value of 0.3385 and can insulate up to ±225 degrees Fahrenheit (from exterior of an exhaust pipe to the exterior of the insulation). These fabrics have a downside of absorbing oils and grease, crystallizing when under a constant heat source and failing thus deteriorating while in use.

Ceramic woven fiber blankets with and without aluminum foil outer wrap were an improvement on glassification but have a problem of absorbing hydrocarbon oil and fuel. The blanket wraps also compress due to hot and cold ambient and exhaust system temperature reducing the heat insulation value of the fabric from ±250 degrees Fahrenheit to ±90 degrees Fahrenheit. The ceramic blankets, in contact with the metal surface, begins of a crystalline break down of the woven material. The blankets start to deteriorate into glassy crystalline powdery particles.

Double walled exhaust piping is presently being used by most manufacturers on today's gasoline vehicles. This piping is more durable and reliable than any other insulation device available heretofore. Air is a well-known insulation if designed properly. The life of the pipe is the life of the insulation. The insulation consistently maintained is ±150 degrees Fahrenheit to ±250 degrees Fahrenheit. This is slightly less than the glass and ceramic designed systems but the life of the insulation source is increased by the metal used in the exhaust pipe (stainless steel, aluminized stainless steel, carbon steel and aluminized carbon steel). The problems generated by this system are that due to the lower insulation temperatures the catalyst has to be moved closer to the engine to reach the present emission standards of the EPA. The problem generated by temperatures between 750 to 1200 degrees Fahrenheit is the need to insulate electrical wiring, plastic components systems, gasoline lines, lubricating fluids for engine and transmissions and must use heat resistant metals inside the firewall area of the vehicles.

The exhaust manufacturers explored ceramic coatings as they tried to improve on the insulation value of the double walled piping system and at the same time reduce manufacturing materials and labor cost. After testing these systems, it was discovered that these coatings had similar insulation values to the double walled piping systems. The problem is the life of the coating. These systems failed because they used organic and/or inorganic materials that absorbed hyrdrocarbons, water, antifreeze, and other corrosive chemicals. They rock-chipped-off of, or thermal shocking to, the coating of the pipe exposing the exterior surface of the metal to the ambient temperature causing a breakdown of the exhaust system catalytic light off and thermal exposure to fuel, lube oil, and electrical system.

The exhaust sleeve using woven glass and ceramic blankets was developed to silence the exhaust noise in tailpipes and mufflers in the 1970's. These systems silenced the exhaust gas noises in the tailpipe but the systems generated heat fatigue in metal casing causing the inner metal to corrode. Most of these systems have to be replaced within three years of average use.

Heat shield devices were designed to cool down the temperature for current vehicles on the road today. These systems use ambient air flowing through the grill to capture the air generated by the forward motion of the vehicle. This is similar to cooling the interior of a vehicle prior to the invention of air conditioning, which is rolling the windows down and driving at high speed in warm or hot weather. This system works as long as the vehicle is moving. The problem with this system is hot or warmer ambient temperatures, stop and go traffic when the engine is hot. Hot ambient temperatures coupled with a hot engine generate extreme temperatures and traps heat generated by a catalytic converter when air is not flowing through vehicle in stop and go traffic. These temperatures can generate heat sources of ±450 degrees Fahrenheit to ±1700 degrees Fahrenheit on the exterior wall of an exhaust pipe or catalytic converter causing hazardous conditions on the engine and accessory components of the vehicle. Diesel engines run at a cooler operating temperature. These may increase exterior wall piping from ±650 degrees Fahrenheit to ±1250 degrees Fahrenheit. This extreme variance can relate to body fatigue (fiberglass polymer cabs and exterior body parts, rubber, fuel systems and electrical systems).

The following represents a list of known related art:

"Enamel: The Preparation, Application, and Properties of Vitreous Enamels," Andrew I. Andrews (The Garrard Press, Champaign, III, 1949);

"Vitreous Enamels," Borax Consolidated Limited (W.S. Cowell Limited, Butter Market, Ipswich, England, 1965);

SAE Technical Paper Series 981984, Exhaust System Containment System, dated Sep. 18–21, 1989;

U.S. Pat. No. 5,057,378 (Nishino et al) discloses a glass ceramic coating for a board with a fine wiring pattern applied thereof most particularly applied to circuit boards for electrical devices;

U.S. Pat. No. 5,363,567 (Best) discloses a self-incinerating oven, with heat exchange and thermal radiation absorption improved by a porcelain enamel coating of the heat exchange tube;

WO Patent 94/18134 (Evans et al), discloses an unleaded transparent vitreous glass composition and articles, published Aug. 18, 1994;

U.S. Pat. No. 5,200,369 (Clifford et al), discloses glaze compositions, issued Apr. 6, 1993;

U.S. Pat. No. 3,853,573 (Ferrigno) discloses fluxing agent modified pigmentary compositions, issued Dec. 10, 1974;

U.S. Pat. No. 4,469,798 (Nishino et al), discloses low melting, opaque enamel frit, issued Sep. 4, 1984;

U.S. Pat. No. 3,836,373 (Ault et al), discloses a method of preparing porcelain enamel frit for dry process enameling, issued Sep. 17, 1974; and U.S. Pat. No. 3,864,140 (Ferrigno) discloses pigmentary compositions with reduced water absorption, issued Feb. 4, 1975.

The teachings of each of the above-listed citations (which does not itself incorporate essential material by reference) are herein incorporated by reference.

Heretofore, application of methods and articles for fusing glass to metal motor vehicle parts with a chemical, thermal, and electrical corrosion resistant dry mix of frit and a novel frit additive, said frit additive consisting essentially of Boric Acid, Potassium Hydroxide, Sodium Silicate, Colloidal Silicate, and pigmentation for color, has never been performed. A chemical, thermal, and electrical corrosion resistant wet mix of water and the chemical, thermal, and electrical corrosion resistant dry mix has never been performed. A method of fusing glass to metal motor vehicle parts using the chemical, thermal, and electrical corrosion resistant wet mix has never been performed.

Therefore, it is highly desirable to create a dry mix for coating motor vehicle parts using a composition including high temperature frit and the novel frit additive. It is highly desirable to create a wet mix for coating motor vehicle parts using high temperature frit and a novel frit additive. It is highly desirable to create methods and articles for coating motor vehicle metal parts with a composition comprising frit and the novel frit additive. It is highly desirable to create methods and articles for creating layers of glass coating on motor vehicle parts where said glass coating layers contains a composition of frit and the novel frit additive.

Potential customers for articles and methods that meet these objects include motor vehicle manufacturers, motor vehicle after market supplier, motor vehicle repair services, and home motor vehicle handypersons.

SUMMARY

Accordingly, it is an object to provide novel methods for solving the abovemen-tioned problems. In particular, it is an object to provide a novel glass coating for motor vehicle parts. It is a further object to provide a dry or wet mix composition, for purposes of single or multi layer glass coating for motor vehicle parts. It is a further object to provide methods and articles for coating motor vehicle metal parts with a chemical, thermal, and electrical corrosion resistant glass coating comprising a dry mix of frit and said novel frit additive. It is a further object to provide methods of coating motor vehicle parts with a dry or wet mix composition of frit and said novel frit additive to achieve a glass coating.

These and other objects and advantages are achieved by the present invention. The present invention provides a dry composition for use in glass fusing metal motor vehicle parts using high temperature frit and a novel frit additive, said frit additive consisting essentially of Boric Acid, Potassium Hydroxide, Sodium Silicate, Colloidal Silicate, and pigmentation for color. The present invention provides a wet composition for glass fusing metal motor vehicle parts using water, high temperature frit and said frit additive. The present invention provides methods and articles for glass fusing metal motor vehicle parts. The present invention provides methods and articles for creating fused glass layers on metal motor vehicle parts.

The novel articles and methods, as compared with previous glass ceramic automotive coatings provide a number of advantages, including, improved in thermal resistance, water resistance and said durability and markedly improved in surface smoothness. Further advantage obtains from the provision of thermal and electrical insulation, spreads heat evenly and cools the insulated article slowly reducing metal fatigue, is chemical, thermal, and electrical corrosion resistant.

The novel articles and methods of the invention are well suited for use in motor vehicles of all types and in the manufacturing processes for making motor vehicles and motor vehicle engines, and in the after market for repair and upkeep of motor vehicles and motor vehicle engines.

Further benefits and advantages of the embodiments of the invention will become apparent from consideration of the following detailed description.

DETAILED DESCRIPTION

The present invention consists essentially of frit, a novel frit additive, and water which yields a chemical, thermal, and electrical corrosion resistant composition. Said composition is then applied to motor vehicle parts, then dried or heated until dry, and then baked upon said motor vehicle part. This provides a novel single layer glass coating to the motor vehicle part. A second layer can be provided to the motor vehicle part by an addition to the initial coating process, or alternative by running through the process a second time. The thickness of the fused glass on the metal motor vehicle part can be controlled by the number of layers of fused glass chosen, as well as the relative amounts of water, frit, and frit additive.

Before describing the working examples of the present invention in detail, the respective process steps used in the invention will be briefly described.

1. Step of mixing high temperature frit and a novel frit additive in a container;
2. Step of adding water to said mix;
3. Step of agitating said water mix;
4. Step of applying said water mix to a metal substrate;
5. Step of drying said metal substrate; and
6. Step of baking said metal substrate.

For the first fused glass layer, high temperature frit, with a softening point in the temperature range 1400 to 2000 degrees Fahrenheit is preferred. A high temperature frit, consisting essentially of 8–20% by weight of $SiO_2$, 10–30% by weight of $B_2O_3$, 20–50% by weight of Mg, 1–20% by weight of CaO, 3–40% by weight of R wherein R is selected from the group consisting of $La_2O_3$ and $CeO_2$, 0–15% by weight of BaO, 0–5% by weight of $MO_2$ (wherein M is at least one metal selected from Zr, Ti and Sn) and 0–5% by weight of $P_2O_5$ can be used. The temperature softening point of the frit can be modified by increasing the level of quartz, replacing by weight the level of silica.

Where the metal motor vehicle part to be glass fused is Stainless Steel 409 with carbon content of not more than 3% and the part is used in the exhaust system of the motor vehicle, the preferred high temperature frit is A.418 High Temperature Enamel from the U.S. Bureau of Standards Compositions and consists essentially of $SiO_2$ in the amount of 28 to 6% by weight, BaO in the amount of 33 to 7% by weight, $B_2O_3$ in the amount of 4 to 9% by weight, $Cr_2O_3$ in the amount of 23 to 0% by weight, ZnO in the amount of 3 to 8% by weight, $Al_2O_3$ in the amount of 0 to 8% by weight, CaO in the amount of 2 to 7% by weight, $MnO_2$ in the amount of 1 to 9% by weight with a clay mill addition of 5 to 0% by weight.

Where the metal motor vehicle part to be glass fused is Stainless Steel 409 with carbon content of not more than 3% and the part is used in the gas fill or neck of the motor vehicle, the preferred high temperature frit is Borax in the amount of 30 to 0% by weight, Felspar in the amount of 11 to 4% by weight, Potassium Nitrate in the amount of 15 to 2% by weight, Titania in the amount of 16 to 6% by weight, Boric Acid in the amount of 7 to 8% by weight, Sodium Silicoflouride in the amount of 6 to 0% by weight, Monammonium Phosphate in the amount of 7 to 0% by weight, and Lithium Carbonate in the amount of 2 to 5% by weight.

Where the metal motor vehicle part to be glass fused is Carbon Steel with carbon content of not more than 3% and the part is used in the exhaust system of the motor vehicle, the preferred high temperature frit is A.19 High Temperature Enamel from the U.S. Bureau of Standards Compositions and consists essentially of $SiO_2$ in the amount of 36 to 3% by weight, $B_2O_3$ in the amount of 14 to 1% by weight, CoO in the amount of 1 to 3% by weight, NiO in the amount of 0 to 5% by weight, $K_2O$ in the 3 to 6% by weight, $Al_2O_3$ in the amount of 26 to 4% by weight, CaO in the amount of 4 to 5% by weight, $Na_2O$ in the amount of 12 to 3% by weight, $MnO_2$ in the amount of 1 to 0% by weight, with a clay mill addition of 10 to 0% by weight.

Where the metal motor vehicle part to be glass fused is Carbon Steel with carbon content of not more than 3% and the part is used in the gas fill or neck of the motor vehicle, the preferred high temperature frit consists essentially of Borax in the amount of 24 to 5% by weight, Quartz in the amount of 49 to 6% by weight, Soda Ash in the amount of 21 to 5% by weight, Sodium Nitrate in the amount of 10 to 0% by weight, Limespar in the amount of 5 to 4% by weight, Titania in the amount of 10 to 9% by weight, Flourspar in the amount of 4 to 6% by weight, Cobalt Oxide in the amount of 0 to 3% by weight, Manganese Dioxide in the amount of 1 to 5% by weight, and Iron Chromate in the amount of 2 to 0% by weight.

Where the metal motor vehicle part to be glass fused is Cast Aluminum with carbon content of not more than 3% and the part is used in the exhaust system of the motor vehicle, the preferred high temperature frit is Boric Acid in the amount of 13 to 6% by weight, Silica in the amount of 18 to 1% by weight, Titania in the amount of 9 to 8% by weight, Soda Ash in the amount of 18 to 9% by weight, Potassium Carbonate in the amount of 9 to 4% by weight, and Red Lead in the amount of 30 to 2% by weight.

Where the metal motor vehicle part to be glass fused is Cast Aluminum with carbon content of not more than 3% and the part is used in the gas fill or neck of the motor vehicle, the preferred high temperature frit is Boric Acid in the amount of 8 to 3% by weight, Silica in the amount of 27 to 1% by weight, Titania in the amount of 9 to 4% by weight, Soda Ash in the amount of 16 to 2% by weight, Lithium Carbonate in the amount of 5 to 7% by weight, Potassium Carbonate in the amount of 12 to 5% by weight, Red Lead in the amount of 20 to 8% by weight.

A novel frit additive consists essentially of Boric Acid, Potassium Hydroxide, Sodium Silicate, Colloidal Silicate, and pigmentation for color. The relative amounts of the novel frit additive are measured against the amount of high temperature frit. The novel frit additive mixed with the high temperature frit yield a chemical, thermal, and electrical corrosion resistant dry mix consisting essentially of high temperature frit, Boric Acid in the amount of 3% by volume of said high temperature frit, Potassium Hydroxide in the amount of 2.5% by volume of said high temperature frit, Sodium Silicate in the amount of 2.5% by volume of said high temperature frit, Colloidal Silicate in the amount of 2.5% by volume of said high temperature frit, and pigmentation for color in the amount of 1.5% by volume of said high temperature frit.

The pigmentation is for color and can be made and added through means well known in the art. Pigment compositions are well known in the industry and can be provided according to U.S. Pat. No. 3,853,573 (Ferrigno), "Enamel: The Preparation, Application, and Properties of Vitreous Enamels," Andrew I. Andrews (The Garrard Press, Champaign, Ill, 1949), or "Vitreous Enamels," Borax Consolidated Limited (W.S. Cowell Limited, Butter Market, Ipswich, England, 1965), among others.

The chemical, thermal, and electrical corrosion resistant dry mix is prepared by mixing high temperature frit and novel frit additive in a container until thoroughly mixed. Water is then added to said chemical, thermal, and electrical corrosion resistant dry mix according to the following ratio: 60 to 70 cubic centimeters of water to 180 to 188 grams of said dry mix. This yields a chemical, thermal, and electrical corrosion resistant composition. A higher percentage of water leads to increased yield of the said resistant composition which effects the viscosity. A thin expanding metal needs a thinner resistant composition.

The chemical, thermal, and electrical corrosion resistant composition is then agitated to thoroughly mix the composition. Said chemical, thermal, and electrical corrosion resistant composition is then applied to the selected metal motor vehicle part through any of several means, including spraying the part, such as in an automated spray booth or through an electrostatic spray system, brushing the part, dipping the part, using an airless spray, or equivalent means. Said part is then dried or heated until the part is dry.

The part is then baked in an oven. The oven baking temperature and baking time depend on the type of metal of the part to be baked. If the part is cast iron, ductile or gray, the part is baked for 14 to 15 minutes in the range of 1400 to 1600 degrees Fahrenheit. If the part is stainless steel or carbon steel, the part is baked for 5 to 8 minutes in the range 1400 to 2000 degrees Fahrenheit. Baking the motor vehicle part that has been treated according to the above composition and process fuses the composition to the metal motor vehicle part through a combination of glass and basic metal elements.

A second fused glass layer can be added to the metal motor vehicle part. The second layer can be applied through a dry method or a wet method. In the dry method, while the part is baking in the oven for the first layer, a lower temperature frit having a softening point in the temperature range of 1100 to 1200 degrees Fahrenheit is substituted for high temperature frit in the chemical, thermal, and electrical corrosion resistant dry mix, and said modified dry mix is then applied to the part while the part is in the temperature range of 1200 to 2000 degrees Fahrenheit, but preferably 1450 degrees Fahrenheit, and then baked for 3 to 4 minutes. In the wet method, the process described earlier is applied a second time to the already glass fused baked part, wherein during the second application the modified, lower temperature frit, chemical, thermal, and electrical corrosion resistant dry mix is substituted for the unmodified, high temperature frit, chemical, thermal, and electrical corrosion resistant dry mix.

A glass fusing composition and process having the compositions in the above-stated range is, as compared with previous means for insulating metal motor vehicle parts, improved in extending the useful life of the plated metal, improved in preventing metal fatigue, and improved in corrosion resistance. A glass fusing composition and process having the composing in the above-stated range is, as compared with related previous glass ceramics, improved in thermal resistance, water resistance and said durability and markedly improved in surface smoothness. A glass fusing composition and process having the composition in the above stated ranges can be used to insulate metal automobile parts, roofing materials, and electrical junction boxes. A glass fusing composition and process having the composition in the above stated ranges provides thermal and electrical insulation, spreads heat evenly and cools the article slowly reducing metal fatigue, is chemical, thermal, and electrical corrosion resistant. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are also possible, their specific designs depending upon the particular application. As such, the scope of the invention should not be limited by the particular embodiments herein described but should be defined only by the appended claims and equivalents thereof.

I claim:

1. A chemical, thermal, and electrical corrosion resistant dry mix for use in fusing glass to metal motor vehicle parts, consisting essentially of high temperature frit, Boric Acid in the amount of 3% by volume of high temperature frit, Potassium Hyrdoxide in the amount of 2.5% by volume of high temperature frit, Sodium Silicate in the amount of 2.5% by volume of high temperature frit, Colloidal Silicate in the amount of 2.5% by volume of high temperature frit, and pigmentation for color in the amount of 1.5% by volume of high temperature frit.

2. A chemical, thermal, and electrical corrosion resistant dry mix for use in fusing glass to metal motor vehicle parts as in claim 1, wherein the high temperature frit has a softening point in the range 1400 to 2000 degrees Fahrenheit and consists essentially of 8–20% by weight of $SiO_2$, 10–30% by weight of $B_2O_3$, 20–50% by weight of Mg, 1–20% by weight of CaO, 3–40% by weight of R wherein R is selected from the group consisting of $La_2O_3$ and $CeO_2$, 0–15% by weight of BaO, 0–5% by weight of $MO_2$ wherein M is at least one metal selected from the group consisting of Zr, Ti and Sn, and 0–5% by weight of $P_2O_5$.

3. A chemical, thermal, and electrical corrosion resistant dry mix for use in fusing glass to metal motor vehicle parts as in claim 1, wherein said metal part is Stainless Steel 409 with carbon content of not more than 3% and the part is used in the exhaust system of the motor vehicle and where the high temperature frit is A.418 High Temperature Enamel from the U.S. Bureau of Standards Compositions has a softening point in the range 1400 to 2000 degrees Fahrenheit and consists essentially of $SiO_2$ in the amount of 28 to 6% by weight, BaO in the amount of 33 to 7% by weight, $B_2O_3$ in the amount of 4 to 9% by weight, $Cr_2O_3$ in the amount of 23 to 0% by weight, ZnO in the amount of 3 to 8% by weight, $Al_2O_3$ in the amount of 0 to 8% by weight, CaO in the amount of 2 to 7% by weight, $MnO_2$ in the amount of 1 to 9% by weight with a clay mill addition of 5 to 0% by weight.

4. A chemical, thermal, and electrical corrosion resistant dry mix for use in fusing glass to metal motor vehicle parts as in claim 1, wherein said metal motor vehicle part Stainless Steel 409 with carbon content of not more than 3% and the part is used in the gas fill or neck of the motor vehicle and wherein the high temperature frit has a softening point in the range 1400 to 2000 degrees Fahrenheit and consists essentially of 30 to 0% by weight Borax, 11 to 4% by weight Felspar, 15 to 2% by weight Potassium Nitrate, 16 to 6% by weight Titania, 7 to 8% by weight Boric Acid, 6 to 0% by weight Sodium Silicoflouride, 7 to 0% by weight Monammonium Phosphate, and in 2 to 5% by weight Lithium Carbonate.

5. A chemical, thermal, and electrical corrosion resistant dry mix for use in fusing glass to metal motor vehicle parts as in claim 1, wherein said metal motor vehicle part to be glass fused is Carbon Steel with carbon content of not more than 3% and the part is used in the exhaust system of the motor vehicle, wherein said high temperature frit is A.19 High Temperature Enamel from the U.S. Bureau of Standards Compositions has a softening point in the range 1400 to 2000 degrees Fahrenheit and consists essentially of 36 to 3% by weight $SiO_2$, 14 to 1% by weight $B_2O_3$, 1 to 3% by weight CoO, 0 to 5% by weight NiO, 3 to 6% by weight $K_2O$, 26 to 4% by weight $Al_2O_3$, 4 to 5% by weight CaO, 12 to 3% by weight $Na_2O$, 1 to 0% by weight $MnO_2$, with a 10 to 0% by weight clay mill addition.

6. A chemical, thermal, and electrical corrosion resistant dry mix for use in fusing glass to metal motor vehicle parts as in claim 1, wherein said metal motor vehicle part to be glass plated is Carbon Steel with carbon content of not more than 3% and the part is used in the gas fill or neck of the motor vehicle, and wherein said high temperature frit has a softening point in the range 1400 degrees to 2000 degrees Fahrenheit and consists essentially of Borax in the amount of 24 to 5% by weight, Quartz in the amount of 49 to 6% by weight, Soda Ash in the amount of 21 to 5% by weight, Sodium Nitrate in the amount of 10 to 0% by weight, Limespar in the amount of 5 to 4% by weight, Titania in the amount of 10 to 9% by weight, Flourspar in the amount of 4 to 6% by weight, Cobalt Oxide in the amount of 0 to 3% by weight, Manganese Dioxide in the amount of 1 to 5% by weight, and Iron Chromate in the amount of 2 to 0% by weight.

7. A chemical, thermal, and electrical corrosion resistant dry mix for use in fusing glass to metal motor vehicle parts as in claim 1, wherein said metal motor vehicle part to be glass plated is Cast Aluminum with carbon content of not more than 3% and the part is used in the exhaust system of the motor vehicle, and wherein said where the high temperature frit has a softening point in the range 1400 degrees to 2000 degrees Fahrenheit and consists essentially of Boric Acid in the amount of 13 to 6% by weight, Silica in the amount of 18 to 1% by weight, Titania in the amount of 9 to 8% by weight, Soda Ash in the amount of 18 to 9% by weight, Potassium Carbonate in the amount of 9 to 4% by weight, and Red Lead in the amount of 30 to 2% by weight.

8. A chemical, thermal, and electrical corrosion resistant dry mix for use in fusing glass to metal motor vehicle parts as in claim 1, wherein said metal motor vehicle part to be glass plated is Cast Aluminum with carbon content of not more than 3% and the part is used in the gas fill or neck of the motor vehicle, and wherein the high temperature frit has a softening point in the range 1400 degrees to 2000 degrees Fahrenheit and consists essentially of Boric Acid in the amount of 8 to 3% by weight, Silica in the amount of 27 to 1% by weight, Titania in the amount of 9 to 4% by weight, Soda Ash in the amount of 16 to 2% by weight, Lithium Carbonate in the amount of 5 to 7% by weight, Potassium Carbonate in the amount of 12 to 5% by weight, Red Lead in the amount of 20 to 8% by weight.

9. A chemical, thermal, and electrical corrosion resistant composition for fusing glass to metal motor vehicle parts, comprising:
   a. water; and
   b. the chemical, thermal, and electrical corrosion resistant dry mix for use in fusing glass to metal motor vehicle parts of claims 1, 2, 3, 4, 5, 6, 7 or 8, added to the water in an amount according to the ratio of 60 to 70 cubic centimeters of water to 180 to 188 grams of said dry mix.

10. A method of fusing glass to metal motor vehicle parts, comprising the steps of:
   a. mixing high temperature frit with a novel frit additive, where said novel frit additive consists essentially of, Boric Acid in the amount of 3% by volume of said high temperature frit, Potassium Hydroxide in the amount of 2.5% by volume of said high temperature frit, Sodium Silicate in the amount of 2.5% by volume of said high temperature frit, Colloidal Silicate in the amount of 2.5% by volume of said high temperature frit, and pigmentation for color in the amount of 1.5% by volume of said high temperature frit, said mix yielding a chemical, thermal, and electrical corrosion resistant dry mix;
   b. adding water to said chemical, thermal, and electrical corrosion resistant dry mix in the ratio amount 60 to 70 cubic centimeters of water to 180 to 188 grams of said chemical, thermal, and electrical corrosion resistant dry mix, said addition yielding a chemical, thermal, and electrical corrosion resistant composition;
   c. agitating said chemical, thermal, and electrical corrosion resistant composition;
   d. applying said agitated chemical, thermal, and electrical corrosion resistant composition to a metal motor vehicle part;
   e. drying said agitated chemical, thermal, and electrical corrosion resistant composition on said metal motor vehicle part through air drying or heat drying until the part is dry; and
   f. baking said dried motor vehicle part in an oven, wherein said part is baked for 14 to 15 minutes at 1400 to 1600 degrees Fahrenheit if said part is cast iron, ductile or gray, and wherein said part is baked for 5 to 8 minutes at 1400 to 2000 degrees Fahrenheit if said part is stainless steel or carbon steel.

11. A method of fusing glass to metal motor vehicle parts as in claim 10, wherein said high temperature frit has a softening point in the range 1400 degrees to 2000 degrees Fahrenheit and consists essentially of 8–20% by weight of $SiO_2$, 10–30% by weight of $B_2O_3$, 20–50% by weight of Mg, 1–20% by weight of CaO, 3–40% by weight of R wherein R is selected from the group consisting of $La_2O_3$ and $CeO_2$, 0–15% by weight of BaO, 0–5% by weight of $MO_2$ (wherein M is at least one metal selected from Zr, Ti and Sn) and 0–5% by weight of $P_2O_5$.

12. A method of fusing glass to metal motor vehicle parts as in claim 10, wherein said metal part is Stainless Steel 409 with carbon content of not more than 3% and the part is used in the exhaust system of the motor vehicle and where the high temperature frit is A.418 High Temperature Enamel from the U.S. Bureau of Standards Compositions has a softening point in the range 1400 degrees to 2000 degrees Fahrenheit and consists essentially of $SiO_2$ in the amount of 28 to 6% by weight, BaO in the amount of 33 to 7% by weight, $B_2O_3$ in the amount of 4 to 9% by weight, $Cr_2O_3$ in the amount of 23 to 0% by weight, ZnO in the amount of 3 to 8% by weight, $Al_2O_3$ in the amount of 0 to 8% by weight, CaO in the amount of 2 to 7% by weight, $MnO_2$ in the amount of 1 to 9% by weight with a clay mill addition of 5 to 0% by weight.

13. A method of fusing glass to metal motor vehicle parts as in claim 10, wherein the said metal motor vehicle part Stainless Steel 409 with carbon content of not more than 3% and the part is used in the gas fill or neck of the motor vehicle and where the high temperature frit has a softening point in the range 1400 degrees to 2000 degrees Fahrenheit and consists essentially of Borax in the amount of 30 to 0% by weight, Felspar in the amount of 11 to 4% by weight, Potassium Nitrate in the amount of 15 to 2% by weight, Titania in the amount of 16 to 6% by weight, Boric Acid in the amount of 7 to 8% by weight, Sodium Silicoflouride in the amount of 6 to 0% by weight, Monammonium Phosphate in the amount of 7 to 0% by weight, and Lithium Carbonate in the amount of 2 to 5% by weight.

14. A method of fusing glass to metal motor vehicle parts as in claim 10, wherein said metal motor vehicle part to be glass fused is Carbon Steel with carbon content of not more than 3% and the part is used in the exhaust system of the motor vehicle, wherein said high temperature frit is A.19 High Temperature Enamel from the U.S. Bureau of Standards Compositions has a softening point in the range 1400 degrees to 2000 degrees Fahrenheit and consists essentially of $SiO_2$ in the amount of 36 to 3% by weight, $B_2O_3$ in the amount of 14 to 1% by weight, CoO in the amount of 1 to 3% by weight, NiO in the amount of 0 to 5% by weight, $K_2O$ in the 3 to 6% by weight, $Al_2O_3$ in the amount of 26 to 4% by weight, CaO in the amount of 4 to 5% by weight, $Na_2O$ in the amount of 12 to 3% by weight, $MnO_2$ in the amount of 1 to 0% by weight, with a clay mill addition of 10 to 0% by weight.

15. A method of fusing glass to metal motor vehicle parts as in claim 10, wherein said metal motor vehicle part to be glass plated is Carbon Steel with carbon content of not more than 3% and the part is used in the gas fill or neck of the motor vehicle, and wherein said high temperature frit has a softening point in the range 1400 degrees to 2000 degrees Fahrenheit and consists essentially of Borax in the amount of 24 to 5% by weight, Quartz in the amount of 49 to 6% by weight, Soda Ash in the amount of 21 to 5% by weight, Sodium Nitrate in the amount of 10 to 0% by weight, Limespar in the amount of 5 to 4% by weight, Titania in the amount of 10 to 9% by weight, Flourspar in the amount of 4 to 6% by weight, Cobalt Oxide in the amount of 0 to 3% by weight, Manganese Dioxide in the amount of 1 to 5% by weight, and Iron Chromate in the amount of 2 to 0% by weight.

16. A method of fusing glass to metal motor vehicle parts as in claim 10, wherein said metal motor vehicle part to be glass plated is Cast Aluminum and the part is used in the exhaust system of the motor vehicle, and wherein said where the high temperature frit has a softening point in the range 1400 degrees to 2000 degrees Fahrenheit and consists essentially of Boric Acid in the amount of 13 to 6% by weight, Silica in the amount of 18 to 1% by weight, Titania in the amount of 9 to 8% by weight, Soda Ash in the amount of 18 to 9% by weight, Potassium Carbonate in the amount of 9 to 4% by weight, and Red Lead in the amount of 30 to 2% by weight.

17. A method of fusing glass to metal motor vehicle parts as in claim 10, wherein said metal motor vehicle part to be glass plated is Cast Aluminum with carbon content of not more than 3% and the part is used in the gas fill or neck of the motor vehicle, and wherein the high temperature frit has a softening point in the range 1400 degrees to 2000 degrees Fahrenheit and consists essentially of Boric Acid in the amount of 8 to 3% by weight, Silica in the amount of 27 to 1% by weight, Titania in the amount of 9 to 4% by weight, Soda Ash in the amount of 16 to 2% by weight, Lithium Carbonate in the amount of 5 to 7% by weight, Potassium Carbonate in the amount of 12 to 5% by weight, Red Lead in the amount of 20 to 8% by weight.

* * * * *